(12) United States Patent
Hetzel et al.

(10) Patent No.: US 7,668,182 B2
(45) Date of Patent: Feb. 23, 2010

(54) SYNCHRONOUS MULTI-CLUSTER NETWORK ARCHITECTURE

(75) Inventors: Herbert Hetzel, Schweigen-Rechtenbach (DE); Patrick Heck, Durmersheim (DE); Christian Thiel, Brannenburg (DE)

(73) Assignee: SMSC Europe GmbH, Karlsruhe (DE)

( * ) Notice: Subject to any disclaimer, the term of this patent is extended or adjusted under 35 U.S.C. 154(b) by 650 days.

(21) Appl. No.: 11/213,306

(22) Filed: Aug. 26, 2005

(65) Prior Publication Data

US 2006/0045135 A1 Mar. 2, 2006

Related U.S. Application Data

(63) Continuation of application No. PCT/EP2004/001925, filed on Feb. 26, 2004.

(30) Foreign Application Priority Data

Feb. 27, 2003 (DE) ............................ 103 08 818

(51) Int. Cl.
*H04L 12/28* (2006.01)
*H04L 12/56* (2006.01)
*H04J 3/06* (2006.01)

(52) U.S. Cl. ........................ 370/401; 370/509

(58) Field of Classification Search ........... 370/401, 370/503, 509; 375/356; 341/61
See application file for complete search history.

(56) References Cited

U.S. PATENT DOCUMENTS

| | | | | |
|---|---|---|---|---|
| 4,914,654 A | * | 4/1990 | Matsuda et al. | 370/522 |
| 5,058,163 A | * | 10/1991 | Lubarsky et al. | 709/208 |
| 5,621,895 A | * | 4/1997 | Weis et al. | 370/407 |
| 5,835,031 A | | 11/1998 | Wolf | |
| 6,111,859 A | * | 8/2000 | Godfrey et al. | 370/257 |
| 6,167,062 A | * | 12/2000 | Hershey et al. | 370/503 |
| 6,324,586 B1 | * | 11/2001 | Johnson | 709/248 |
| 6,522,651 B2 | | 2/2003 | Herrmann | |
| 6,694,139 B1 | | 2/2004 | Sugaya et al. | |
| 6,731,640 B1 | * | 5/2004 | Perry et al. | 370/395.6 |
| 6,975,654 B1 | * | 12/2005 | Domon | 370/509 |
| 7,058,729 B1 | * | 6/2006 | Le Scolan et al. | 709/248 |
| 7,209,488 B2 | * | 4/2007 | Becker et al. | 370/406 |
| 2002/0051468 A1 | * | 5/2002 | Ofek et al. | 370/503 |
| 2002/0116103 A1 | * | 8/2002 | Matsunaga et al. | 701/29 |
| 2002/0129160 A1 | * | 9/2002 | Habetha | 709/236 |

(Continued)

FOREIGN PATENT DOCUMENTS

DE 19526332 1/1997

(Continued)

OTHER PUBLICATIONS

MOST Specification, Rev. 2.4, May 2005.

(Continued)

*Primary Examiner*—Kevin C Harper
(74) *Attorney, Agent, or Firm*—Kevin L. Daffer; Daffer McDaniel LLP

(57) ABSTRACT

A network for data transmission comprises a plurality of sub-networks for transmitting data in data frames. The sub-networks have different transmission rates and are connected to each other via at least one gateway. The transmission of the data frames is effected with a defined timing relationship between the sub-networks.

24 Claims, 3 Drawing Sheets

U.S. PATENT DOCUMENTS

2003/0072053 A1* 4/2003 Weaver et al. ............... 359/124
2008/0288954 A1* 11/2008 Fuchs et al. ................. 719/310

FOREIGN PATENT DOCUMENTS

| EP | 0722233 | 7/1996 |
| EP | 1052793 | 11/2000 |
| JP | 2001-111562 | 4/2001 |

OTHER PUBLICATIONS

MOST Dynamic Specification, Rev. 1.1, Jan. 2005.
Bocker, The Integrated Services Digital Network: Concepts, Methods, Systems—© Springer-Verlag Berlin Heidelberg 1988.
International Search Report, PCT/EP2004/001925, mailed Jul. 13, 2004.

* cited by examiner

SYNCHRONOUS MULTI-CLUSTER NETWORK ARCHITECTURE

CROSS REFERENCE TO RELATED APPLICATIONS

This application is a continuation of pending International Application No. PCT/EP2004/001925 filed on Feb. 26, 2004, which designates the United States and claims priority from pending German Application No. 103 08 818.0 filed on Feb. 27, 2003.

BACKGROUND OF THE INVENTION

1. Field of the Invention

The invention relates to a network enabling a synchronous data transmission with random addressing within various sub-networks, and also to a method for creating a network of this kind for data transmission.

2. Description of Prior Art

There are a number of different network types for various cases of application. The requirements of reliability, certainty of transmission and real-time capability vary accordingly. Thus, for example, for transmitting package data such as e-mails or files, relatively few demands are made on the network concerning bandwidth and certainty of transmission. Contrary to this, for a transmission of control and safety relevant data, such as in motor vehicles, high demands are made on real-time capability and reliability, whilst here too a relatively low bandwidth can be tolerated. Such data, for which a deterministic, i.e. predictable transmission characteristic, is required, are designated as control data. With multimedia applications, for transmission of synchronous data, a real-time capability and also a medium to high bandwidth are required. In order to satisfy these requirements at costs that are as low as possible at the same time, networks which are optimized for the purposes are employed in each case.

Thus, for example in motor vehicles, there is usually at least one control data network that controls the chassis and motor functions, and also connects sensors and actuators to the control units. In addition, there is frequently a further control data network for the vehicle body functions such as lighting, air-conditioning and window lifters, and other functions of this kind. Another network for synchronous and simultaneous control data transmission can be found in the infotainment field for multimedia transmission. It interconnects functions such as telephone, navigation unit and audio system, and also one or more video systems with each other. For the field of safety too, there are special networks for controlling air bags and accident sensors. In many cases the networks were developed independently from each other in accordance with the needs of the functions to be controlled by them, and they have different transmission bandwidths. Each of them are used for running respectively different mechanisms for network management, data safeguarding, handshaking, and segmentation of data packages. Connectors between these different network worlds and network philosophies are formed by so-called gateways that must interconvert data and philosophies.

The stronger the logical connection between functions are, including those involving a plurality of these networks, and the more different the networks are, the more complex do these converters, i.e. the gateways, become. But also differences of the philosophies of the networks per se lead to problems. Thus, for example, the starting up of a system of several networks which are each implemented with different starting-up mechanisms is a highly complex operation that can be reliably controlled only with difficulty. Even a real-time capability of such systems is in no way given. When an ensuring of timing determinism on individual networks such as a Controller Area Network (CAN) is already an extremely complex operation, then this becomes near impossible throughout a plurality of networks and gateways. The delaying of a message between two subscribers on different networks depends not only upon the delays in the individual networks, but also upon the momentary prevailing load on the intermediate gateway or gateways, and upon the overall situation of messages momentarily waiting to be converted. Control and regulating means can hardly be applied. Although known priority control means reduce the total delay, they provide no determinism.

Another network in accordance with prior art is MOST (Media Oriented Systems Transport). MOST is defined by the MOST Specification Rev. 2.2; the MOST Cooperation November 2002 and the MOST Specification Framework Rev. 1.1; and the MOST Cooperation 1999 which are to be regarded a part of the present patent application.

This MOST network by itself makes possible a deterministic transmission of control data and synchronous data in addition to normal package data. However, in combination with other networks, a deterministic transmission is hardly any longer possible because, owing to the gateways, undefined delay times result.

A method for transmitting data via widely different networks is disclosed in U.S. Pat. No. 6,522,651. In this, an adaptation of certain data to a package size determined by the network is performed by means of a suitable algorithm. However, with this method also a deterministic transmission is not possible.

A purely deterministic transmission is possible with ISDN; see Peter Bocker, "ISDN—Das dienstintegrierende digitale Nachrichtennetz, Konzepte, Verfahren, Systeme," Springer Verlag, Berlin 1987 ("ISDN—The Service Integrating Digital Information Network, Concepts, Methods, Systems," published by Springer Verlag, Berlin, 1987). The global ISDN network consists of a multitude of interconnected sub-networks. In these, data are transmitted with synchronous timing at a given clock frequency. A plurality of networks of a low hierarchy level, having low data rates, are combined to form networks of higher hierarchy levels, having higher data rates. In this, fixed positions in the data frames of the higher hierarchy levels are assigned to the data of the networks of low hierarchy levels. ISDN networks are implemented exclusively as point-to-point connections. Thus, at the beginning of a communication, a point-to-point connection between two desired subscribers is established from a large number of possible subscribers. This connection now remains in existence for a certain time for communication. During this time the data to be transmitted are transmitted with synchronous timing along the physical and logical path defined during the establishment of the connection. During a connection the logical and physical path of the connection, and with it also the assignment of the positions of the data in the data frames normally remains existent. Because ISDN was originally conceived for telecommunication technology, in particular for transmission of speech and package data between two subscribers, it is optimized exclusively for point-to-point connections. A connection between a plurality of different subscribers (multicast), as is necessary in modern data bus systems, is not possible with ISDN. Basically ISDN enables a limited real-time transmission with a transit time of the order of a few 100 ms. However, this only applies when a connection has been already built up. If a connection first must be newly built up, then delay times within a range of seconds are probable. Now, in order to configure a real-time capable network with deterministic delay times by means of ISDN, in which random communication between any subscribers is possible, a connection would have to be built up at the beginning of a communication for all combinations of subscribers wishing to communicate with each other, and would need to have available the maximum necessary bandwidth needed for subsequent data transmission. Thus, in a bus system connecting, for example, 10 subscribers to each other with a maximum transmission rate of 10 Mbit per second, 45 point-to-point connections with a transmission rate of 10 Mbit per second would have to be kept available, even if this maximum data rate is used, for example, only once per second.

BRIEF SUMMARY OF THE INVENTION

The invention is based on the object of creating a network architecture in which a plurality of sub-networks are connected to each other, wherein a random addressing of individual subscribers for predetermined or any data frames or parts of data frames is possible, and a deterministic transmission of control data or synchronous data is possible in addition to a transmission of package data between the subscribers. Furthermore, in an advantageous manner the outlay of the gateways is to be reduced, and the deterministic transmission is to be ensured even throughout a plurality of network clusters and gateways.

In accordance with the invention this object is achieved by a network for data transmission, comprising: a plurality of sub-networks for transmitting data in data frames, in which each sub-network has at least two subscribers; and at least one gateway connecting each sub-network to at least one other sub-network for transmission of data between the sub-networks; wherein at least one first sub-network is configured for at least one of simultaneous addressing of data frames to a plurality of subscribers (broadcast or multicast), and random addressing of single data frames or parts of data frames, and this at least one first sub-network is furthermore adapted for synchronous transmission of synchronous data or control data, and normal package data; and for real-time transmission with deterministic transmission times between sub-networks by an exchange of time synchronization signals and a synchronization of at least one first sub-network and at least one other sub-network with these signals, a transmission of individual data frames between the respective sub-networks is effected with a defined timing relationship between the sub-networks.

BRIEF DESCRIPTION OF THE DRAWINGS

In the following the invention will be described by way of example, without limitation of the general inventive concept, on examples of embodiment with reference to the drawings.

DETAILED DESCRIPTION OF THE INVENTION

Figure 1:
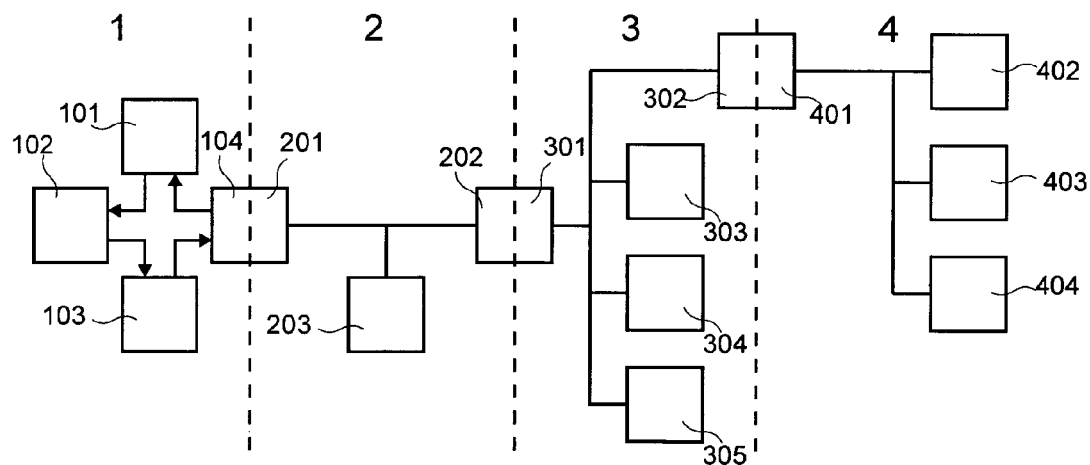
FIG. 1 schematically shows in a general form a device in accordance with the invention.

FIG. 1 shows in a schematic form a typical network comprising a plurality of sub-networks. A first sub-network 1 comprises network nodes 101, 102, 103, 104. By way of example it is configured as a circular bus. Each network node is connected to two neighboring nodes. The direction of transmission of signals is indicated by the arrows. A second sub-network 2 comprises network nodes 201, 202, 203. Here all network nodes are connected to each other via a common bus conductor system. A third sub-network 3 comprises network nodes 301, 302, 303, 304, 305. Finally, a fourth sub-network 4 is provided, having network nodes 401, 402, 403, 404. Like the two previously mentioned sub-networks, this network too has a linear structure. Gateways are provided for connecting the sub-networks. A first gateway comprises the network nodes 104, 201. A second gateway comprises the net-work nodes 202, 301. Finally a third gateway comprises the net-work nodes 302, 401. These sub-networks are mainly adapted for their given tasks, and therefore have basically different physical and logical properties. Thus, for example, the sub-network 1 may be based on an optical circular bus, such as a MOST bus. The sub-network 2 may be a local parallel bus system disposed on a printed circuit board or a chip. Finally, by way of example, the two sub-networks 3 and 4 may be constructed as a slow serial bus such as, for example, CAN. Now according to the invention, the data frames are transmitted in a predetermined defined timing relationship to each other.

Figure 2:
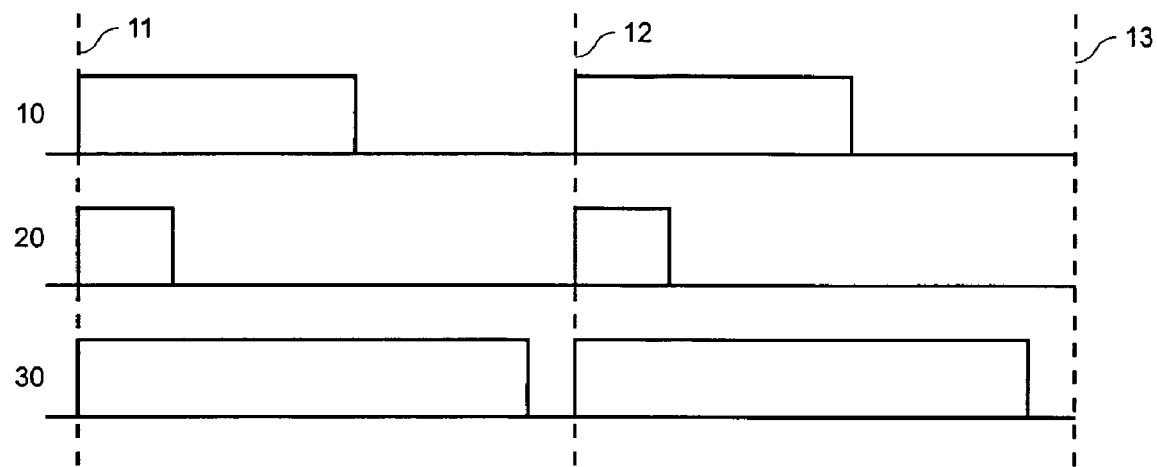
FIG. 2 schematically shows a variation of data frames with time in different sub-networks.

FIG. 2 schematically shows a variation with time of different data frames. A first curve 10 shows by way of example a transmission of data frames in the first sub-network. A curve 20 shows the data frames of the second sub-network, and finally a curve 30 shows the data frames of the third and the fourth sub-network. The data frames may be of different lengths, they may last only briefly during a time raster, or they may completely fill the time raster, this corresponding to a continuous data stream. However, in the present example the frames each start at discrete points of time 11, 12, 13. Thus the curve 20 exhibits the shortest data frames, because the sub-network 2 has the highest transmission speed. Similarly, of course, the data frames may be also transmitted with an exactly defined time shift. As a rule, a shift of this kind results during the technical performance, because the transit times of the electronic components are always finite. It is essential to the invention that this shift be either negligibly small or at least defined and preferably constant. If this shift strongly fluctuates, then it may be dynamically determined by measurement. It can now be suitably compensated, or a suitable value can be signaled together with the respective data frames. Further, non-synchronous data such as normal package data can be transmitted in the gaps between synchronous data.

Figure 3:
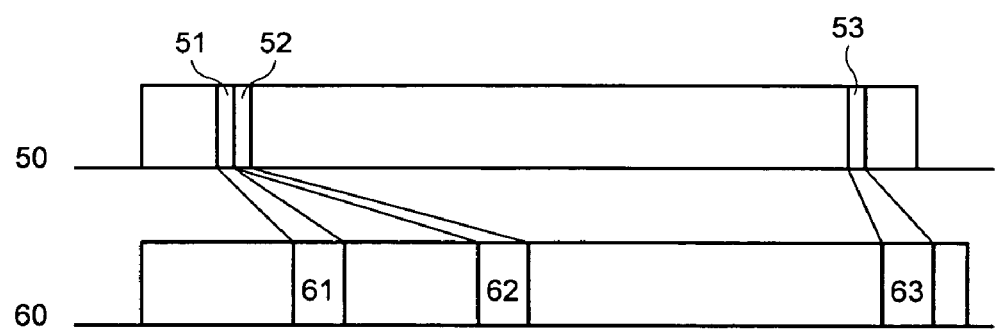
FIG. 3 shows a conversion of data upon transfer between sub-networks.

FIG. 3 illustrates a conversion of data between sub-networks through a gateway as provided, for example, to comprise the network nodes 202 and 301 for connecting the sub-networks 2 and 3. A first data frame of a first data stream 50 having a relatively high data rate, for example from the sub-network 5, has by way of example three data words 51, 52, 53 that are taken up in a second data stream 60 of lower data rate, for example from the sub-network 3. The gateway inserts the data here at the positions 61, 62, 63. Owing to the fixed predetermined timing relationship between the data frames, and the fixed predetermined positions, the gateway need not analyze the data stream, but can simply perform a conversion within fixed predetermined positions. Thus, the data to be transmitted in a slow network can be selected from a fast data stream, and vice versa, in a simple manner. Because of the determinism in a synchronous system, the data of a data frame from the first data stream 50 can be incorporated in a data frame of the data stream 60 already whilst it is being sent out. This is not possible with non-deterministic and non-synchronous bus systems, because at the instant of the emission it is not yet known which data will be received from the data stream 50.

Figure 4:
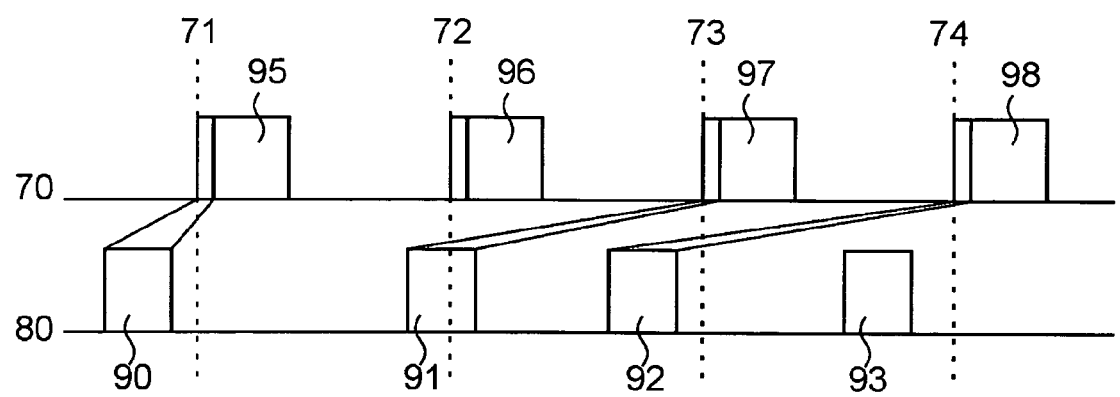
FIG. 4 shows an asynchronous transfer between sub-networks.

In FIG. 4 an asynchronous transfer between sub-networks is illustrated. The non-synchronous data of a data stream 80 are emitted via a gateway at earliest together with the next data frame (frame) to be issued in the data stream 70, because for a data frame to be emitted, its content must already be known, and this must therefore be received before the emission. These problems do not occur with bus systems, as shown for example in FIG. 3, that are synchronized with each other in accordance with the invention.

Thus, single frames 90, 91, 92, 93 of the first data stream 80 are converted to larger frames 95, 96, 97, 98 of a second data stream 70 of higher data rate. Additional information is added at the same time. As the frame 90 was received in time before the start of transmission of the frame 95, viz. at the instant 71, the content of this frame 90 can be correctly relayed by means of frame 95. The frame 91 could no longer be received before the start of the emission of the frame 96 at the instant 72, therefore the information of frame 91 cannot be further transmitted with the frame 96. This is therefore shorter, or is filled with fill characters. The information of frame 91 may be relayed at earliest with frame 97, beginning at the instance 73. Hereby the information of the subsequent frames 92, 93 can be relayed only with the later frames 98 (instant 74) etc. Although the mean frame rate of the first data stream 80 corresponds to the mean frame rate of the data stream 70, one data block was skipped owing to a brief time shift, and it can no longer be recovered and results in non-deterministic delays of transmission.

A network for data transmission further comprises a plurality of sub-networks (here also referred to as clusters) in which data are transmitted in the form of data frames (in the following also referred to as frame). A sub-network comprises at least two, but preferably a large number, of subscribers. The data frames on the individual networks may be differently configured. Thus, in particular, the size of the data frames may vary. A data frame may thus comprise only a few bits, but also long sequences of many kilobits.

Optionally package data, control data, or even synchronous data must be transmitted with the aid of the data frames, and individual kinds of data may also be in combination within one single data frame. According to the invention, a first sub-network is configured for simultaneous addressing of data to a plurality of subscribers (broadcast or multicast), and/or for random addressing of single data packages or data frames, or parts of data frames, to different subscribers. Furthermore, this first sub-network is configured for alternate transmission of a plurality of kinds of data such as package data, control data, or also synchronous data. In this, different kinds of data may be transported in one single data frame and/or in successive data frames, according to the configuration of the network.

A network in accordance with the invention comprises at least one further sub-network which is configured for transmission rates that are the same as, or different from, those of the first sub-network. The term transmission rate here refers to the speed with which information can be transmitted via a network or sub-network. This term is not to be confused with the clock frequency of a transmission clock. Thus, for example, in a parallel bus system having a plurality of lines, as distinct from a series bus system having only one line, higher transmission rates may be achieved at the same clock rate, because different information may be transmitted simultaneously.

Furthermore, in a network according to the invention; at least one sub-network is connected to at least one first sub-network via a gateway for transmission of data between the sub-networks.

In accordance with the invention, the sub-networks having different transmission rates are configured so that in them a transmission of individual data frames is effected with a defined timing relationship between the sub-networks. This results in a defined timing behavior of the entire bus system. For timing synchronization, a signaling of the data rate, or of a signal synchronous thereto, is provided. For example, here a frame clock is suitable in addition to the bit clock.

The invention may be illustrated by way of example by generalizing the known frame structure of a MOST optical circular bus. With this bus, a subscriber of the network generates a permanent data stream at a fixed frequency (e.g. 22.5 Mbps), which is relayed from subscriber to subscriber along an at least logical circular structure. A frame is cyclically modulated onto the data stream at a fixed frame rate (e.g. 44.1 kHz). A transport of data is effected in this frame. Each frame contains a fixed number of bytes (e.g. 64). Each byte in the frame may be assigned (singly and dynamically) to a definite data transport application. Thus, for example, in each frame the fifth and sixth byte may be reserved for transporting an audio mono-channel in digitized form. Alternatively, byte 9 may be reserved for transporting control packages similar to CAN. At each subscriber a network log engine is located within the network interface, which then performs, for example on the byte channel of byte 9, CRC checks, ACK/NAK mechanisms, or an automatic repetition of messages in the case of an error. Generally described, various busses or data transport logs are multiplexed into the serial data stream.

According to the invention, frames for various network clusters of different speeds are formed, whilst a fixed timing relationship is retained. Thereby the timing relationship between these clusters is fixed. All of these clusters operate as synchronized clock and frame slaves with respect to a dedicated clock and frame master. The subscriber who acts as the clock and frame master is immaterial and may be fixedly defined according to aspects of the system architecture, or alternatively an arbitration mechanism is defined. In a motor vehicle it is expedient to assign this role to a central gateway. Even redundancies are possible.

A network in accordance with the invention may be employed with special advantage in motor vehicles, because here a particularly large variety of different networks must be combined with each other, whilst highest demands are made on safety and real-time capability. Similarly, a network in accordance with the invention may also be employed in aerospace technology or in stationary fields of application, such as in automation technology and plant technology, for example in machine tools or building networks, and also in home entertainment.

Because all operations in the system run via a plurality of clusters in strict synchrony with the clock and frame master, all operations dependent thereupon are absolutely deterministic with respect to time. For MOST it is today already known that a processing of a frame takes a small but exactly deterministic time at each subscriber. Therefore, today already all operations with MOST are strictly synchronous and deterministic. However, a further substantial step is taken here, and a synchronism and a determinism is established in the entire system throughout a plurality of clusters of different speeds.

The invention is distinct in that homogeneous distributed systems may be achieved, yet without need of dispensing with an achievement of clusters having different data rates, transport mechanisms and physical layers. In this way, the costs of network interfaces may be kept in accordance with requirements, and thus as low as possible. The outlay for a conversion of communication in the gateways is reduced to that of pure switching. Thereby the systems become substantially more simple, more easy to survey, and therewith more manageable.

A further advantage is that the entire system runs strictly synchronously and deterministically with respect to time. Thus, control and regulating tasks, and also real-time audio/video transport may be achieved even throughout a plurality of clusters.

In a particularly advantageous embodiment of the invention, the transmission clock frequencies of at least one further sub-network are in a ratio of n:m with reference to a first sub-network, where n and m are whole numbers greater than 0. In such cases, in which whole-number relationships exist between the data clock frequencies, a synchronization is possible by means of simple frequency dividers.

In a further embodiment of the invention, at least one sub-network, preferably a first sub-network, is configured in accordance with the above-mentioned MOST Specification.

In a further embodiment, at least one additional sub-network is provided that is configured for a time-uncorrelated transmission of individual data frames. Sub-networks of this kind may be connected to the network according to the invention only with loss of the real-time capability, or with high additional outlay. However, a connection of this kind is expedient when only simple control information which is not critical with respect to time is to be exchanged.

In another advantageous embodiment of the invention at least one further network is provided that has the same transmission rate as a first sub-network, connected thereto, of the network according to the invention. In this case, a synchronization may be achieved in a particularly easy way and manner.

Another embodiment of the invention provides for at least one sub-network to be based on an optical bus. Optical busses are particularly characterized by being highly robust and insensitive to electromagnetic interference, and are therefore increasingly employed, particularly in motor vehicles. A device according to the invention operates independently from the physical configuration of the bus, so that even optical and electrical busses may be used as carriers of individual sub-networks. With these, even inhomogeneous structures of optical and electrical or wireless clusters may be formed.

Another embodiment of the invention consists in that at least one sub-network is based on a circular bus. Circular busses make possible a deterministic and, in particular, real-time capable transmission at relatively small outlay. Therefore they are preferably to be provided in a bus system that is employed for real-time capable transmission of signals. Of course, according to the invention other bus systems also may be employed in sub-networks.

In another embodiment of the invention various frame rates are formed which, however, are in a given fixed ratio to each other. Thus, for example, in a sub-network the transmission of two frames may be effected whilst only one frame is being transmitted in another sub-network.

In another embodiment of the invention, all frames in one system are of the same length of time. According to the desired speed of a cluster, a definite number of bytes are now placed in its frame. For example 128 with a multimedia cluster, 256 with a high speed backbone, and only 8 with a low speed cluster. At a frame rate of 44.1 kHz, this results in about 45 Mbps for the multimedia cluster, 90 Mbps for the backbone, and 0.7 Mbps for the low speed cluster. According to the speed of a cluster, different physical layers can be used for data transmission.

Another embodiment of the invention provides that information concerning the timing relationship of the data frames to other network nodes or sub-networks is transmitted within a network. By relaying this information that indicates the time-shift between the data frames within different sub-networks, an even more exact synchronization may be achieved. Thus, during the transmission of the data a relatively simple and inexact synchronization between the sub-networks is achieved, whilst for an exact synchronization the exact time shift is also transmitted. The synchronization can comprise single nodes or whole sub-networks. Information concerning the timing relationship may be communicated dynamically in each data frame, but also at longer intervals of time.

In another embodiment of the invention, all sub-networks are synchronized with each other via a common clock. Of course, this clock may also indicate a multiple or a fraction of the frequency of emission of data frames or data bits. Preferably however, the clock is so designed that an emission of the data frames starts at a defined flank of the clock signal.

In another embodiment of the invention at least one gateway is configured between the clusters so that all or merely a few bytes of the incoming frames of one cluster are copied into the outgoing frame of the other cluster, and vice versa. In this manner the gateways become mere switches. They need no longer analyze, filter and convert the incoming data. The incoming bytes are simply inserted synchronously into outgoing data frames of the other cluster. Because of the strictly deterministically maintained time of copying (a simple operation with absolutely foreseeable constant outlay), the timing determinism may be maintained with the method according to the invention even via the gateways (switches in this case). Furthermore, in each gateway also an application may be put into practice which by itself participates in the network traffic and shares the network interface with the switch.

A plurality of byte channels, as known for example from MOST, may be connected logically to form a unit, and a data transport log or a transport mechanism may be set up. As an example: on a low speed cluster a frame has 4 bytes. On this a transport log is run with addressed package data transmission with CRC, handshaking, package repetition in case of error, etc. In a gateway these 4 bytes are copied onto the frame of the backbone cluster at the positions byte 8-11, and relayed "piggyback." In a second gateway these 4 bytes are copied onto the byte positions 0-3 in the frame of the multimedia cluster. A subscriber to the multimedia cluster can now communicate directly with his communication partners in the low speed cluster via the byte channels 0-3, or serve a private package channel of the multimedia cluster, for example on the channels 16-23, whilst serving a stereo-audio-channel as a source on bytes 8-15.

Another embodiment of the invention provides means for signaling the type of copying operation, in particular via an additional signal line. Basically, a rule for a distribution of the data can be communicated through any desired separate data channel. For this, known methods as already used nowadays in MOST for purposes of channel allocation can be used. Signaling could be effected, for example, through a separate control line which signals by means of a logical level an instant of time at which the data just transmitted via the network are to be transmitted into a particular neighboring sub-network. For selection of a plurality of neighboring sub-networks, a plurality of control lines, for example also binary coded, could be suitably used.

In another advantageous embodiment of the invention a cluster may also be divided into a plurality of single clusters which run, spatially separated, at different positions. They are connected via a fast backbone to form one single cluster by tunneling their communication (bytes in frame) via the frame of the backbone. Thus, for example, a hierarchic structure of networks may be achieved. Basically, the inventive concept may be applied to any desired network topology.

Another embodiment of the invention provides that at least one sub-network has network addressing comprising at least one sub-network internal address or sub-address, and also at least one global address or sub-address. Thus, global addressing is possible within the combined global network.

In another advantageous embodiment of the invention, network nodes are provided which have means for synchronizing the emission of individual data frames or groups of data frames. Here a synchronization can be effected by data frames of other networks, or a common synchronization clock.

According to the invention, at least one network knot of a sub-network in a network of sub-networks having different transmission rates is configured so that it has means for synchronizing the emission of data frames with other networks of sub-networks having other transmission rates, or with a synchronization clock that synchronizes a plurality of sub-networks having different transmission rates.

A gateway of a network in accordance with the invention comprises at least two network nodes connected to different sub-networks. Within the gateway the transmission between the nodes is advantageously effected so that the data frames have a defined timing relationship with each other. Of particular advantage is a synchronous transmission. A gateway of this kind is advantageously formed on a printed circuit board, but preferably within a single chip. To effect switching, a switch may now be optionally assigned to individual network nodes for copying the data in the individual data frames. Similarly, however, a central switch may be provided for connecting a plurality of network nodes.

In an advantageous manner the clock rate and/or the frame rate of a second sub-network is synchronized to the clock rate and/or the frame rate of a first sub-network by the gateway.

A method according to the invention for operating a network comprising a plurality of sub-networks having different transmission rates comprises the following steps: connecting sub-networks to form a network, and transmitting data frames in the individual sub-networks with a defined timing relationship, and preferably synchronizing the data rates and/or frame rates of the individual sub-networks.

The invention claimed is:

1. A network for data transmission, comprising:
   a plurality of sub-networks for transmitting data in data frames, in which each sub-network has at least two subscribers, wherein at least two of the sub-networks have different transmission rates, and wherein one of the sub-networks serves as a dedicated clock and frame rate master for synchronizing the clocks and frame rates of all other sub-networks;
   at least one gateway connecting each sub-network to at least one other sub-network for transmission of data between the sub-networks;
   at least one first sub-network is configured for at least one of simultaneous addressing of data frames to a plurality of subscribers, and random addressing of single data frames or parts of data frames, and this at least one first sub-network is furthermore adapted for synchronous transmission of synchronous data or control data, and normal package data; and
   for real-time transmission with deterministic transmission times between sub-networks by an exchange of time synchronization signals and a synchronization of the at least one first sub-network and at least one other sub-network with these signals, a transmission of individual data frames between the respective sub-networks is effected with a defined timing relationship between the sub-networks.

2. The network according to claim 1, wherein transmission clock frequencies of at least one further sub-network are in a ratio of n:m to those of a first sub-network, where n and m are whole numbers.

3. The network according to claim 1, wherein at least one sub-network is configured in accordance with the MOST Specification.

4. The network according to claim 1, wherein additionally at least one further sub-network is provided and configured so that in it a transmission of individual data frames is effected without correlation of timing with other sub-networks.

5. The network according to claim 1, wherein additionally at least one further sub-network is provided that has the same transmission rate as the first sub-network.

6. The network according to claim 1, wherein at least one sub-network is based on an optical bus.

7. The network according to claim 1, wherein at least one sub-network is based on a circular bus.

8. The network according to claim 1, wherein numbers of data frames transmitted within a certain time interval in different sub-networks are in a definite given ratio to each other.

9. The network according to claim 1, wherein data frames transmitted within different sub-networks have the same duration of time.

10. The network according to claim 1, wherein information concerning a timing relationship with other sub-networks is transmitted at least within one sub-network.

11. The network according to claim 1, wherein a plurality of sub-networks are synchronized with each other via a common clock.

12. The network according to claim 1, wherein at least one gateway for connecting a plurality of sub-networks is configured so that it copies single bits or data words at given positions of data frames of a sub-network to given positions of data frames of another sub-network.

13. The network according to claim 12, wherein means are provided for signaling a copying operation.

14. The network according to claim 1, wherein at least one sub-network is itself divided into further sub-networks which in turn are connected to a single sub-network.

15. The network according to claim 1, wherein at least one sub-network comprises network addressing that includes at least one sub-network internal address or sub-address, and also at least one global address or sub-address.

16. The network according to claim 1, wherein at least one network node is provided which has means for synchronizing an emission of single data frames or groups of data frames with other sub-networks having different transmission rates, or with a synchronization clock to synchronize the plurality of sub-networks.

17. A network node for a data transmission network that comprises:
   a plurality of sub-networks for transmitting data in data frames, in which each sub network has at least two subscribers, wherein at least two of the sub-networks have different transmission rates, and wherein one of the sub-networks serves as a dedicated clock and frame rate master for synchronizing the clocks and frame rates of all other sub-networks;

at least one gateway connecting each sub-network to at least one other sub-network for transmission of data between the sub-networks; and at least one first sub-network is configured for at least one of simultaneous addressing of data frames to a plurality of subscribers, and random addressing of single data frames or parts of data frames, and this at least one first sub-network is furthermore adapted for synchronous transmission of synchronizing data or control data, and normal package data;

wherein means are provided for synchronizing the emission of data with other network nodes, or with a synchronizing clock.

18. A gateway for a data transmission network that comprises:

a plurality of sub-networks for transmitting data in data frames, in which each sub-network has at least two subscribers, wherein at least two of the sub-networks have different transmission rates, and wherein one of the sub-networks serves as a dedicated clock and frame rate master for synchronizing the clocks and frame rates of all other sub-networks;

at least one gateway connecting each sub-network to at least one other sub-network for transmission of data between the sub-networks, wherein the gateway comprises at least two network nodes, at least two network nodes being connected to different sub-networks;

at least one first sub-network configured for at least one of simultaneous addressing of data frames to a plurality of subscribers, and random addressing of single data frames or parts of data frames, and this at least one first sub-network is furthermore adapted for synchronous transmission of synchronizing data or control data, and normal package data;

for real-time transmission with deterministic transmission times between sub-networks by an exchange of time synchronization signals and a synchronization of at least one first sub-network and at least one other sub-network with these signals, a transmission of individual data frames between the respective sub-networks is effected with a defined timing relationship between the sub-networks.

19. A gateway for a data transmission network that comprises:

a plurality of sub-networks for transmitting data in data frames, in which each sub-network has at least two subscribers, wherein at least two of the sub-networks have different transmission rates;

at least one gateway connecting each sub-network to at least one other sub-network for transmission of data between the sub-networks, wherein the gateway comprises at least two network nodes of different sub-networks;

at least one first sub-network is configured for at least one of simultaneous addressing of data frames to a plurality of subscribers, and random addressing of single data frames or parts of data frames, and this at least one first sub-network is furthermore adapted for synchronous transmission of synchronizing data or control data, and normal package data;

for real-time transmission with deterministic transmission times between sub-networks by an exchange of time synchronization signals and a synchronization of at least one first sub-network and at least one other sub-network with these signals, a transmission of individual data frames between the respective sub-networks is effected with a defined timing relationship between the sub-networks;

wherein at least one of a clock rate and a frame rate of a second sub-network is synchronized with at least one of a clock rate and a frame rate of a first sub network; and wherein one of the sub-networks serves as a dedicated clock and frame rate master for synchronizing the clock rates and frame rates of all other sub-networks.

20. A method for operating a network that comprises a plurality of sub-networks, the method comprising:

connecting at least one first sub-network to at least one other sub-network by means of at least one gateway for transmission of data between the plurality of sub-networks, at least two of which have different transmission rates;

configuring at least one first sub-network for at least one of simultaneous addressing of data frames to a plurality of subscribers, and random addressing of single data frames or parts of data frames, and adapting this at least one first sub-network for synchronous transmission of synchronous data or control data and normal package data;

synchronizing the at least one other sub-network to the at least one first sub-network with at least one of a clock rate and a frame rate of the at least one first sub-network, wherein the first sub-network serves as dedicated clock and frame rate master for synchronization of the clocks and frame rates of all other sub-networks; and transmitting data frames between individual sub-networks with a defined timing relationship between the sub-networks.

21. The network according to claim 13, wherein the means for signaling a copying operation is an additional signal line.

22. The network according to claim 14, wherein the further sub-networks are connected to the single sub-network via a fast backbone.

23. The network according to claim 18, wherein a synchronous transmission is provided between at least two network nodes.

24. The method according to claim 20, wherein said transmitting the data frames in the individual sub-networks with a defined timing relationship comprises synchronizing at least one of data rates and frame rates of the individual sub-networks.

* * * * *